3,103,516
N - (β-TERTIARYAMINO-LOWER ALKYL-β-META-OXY-PHENYL)-LOWER ALKYL ALKENYL AND ARYL AMIDES

Karl Schmitt and Ernst Lindner, Frankfurt am Main, and Willi Meixner, Hofheim, Taunus, Germany, assignors to Farbwerke Hoechst Aktiengesellschaft vormals Meister Lucius & Brüning, Frankfurt am Main, Germany, a corporation of Germany
No Drawing. Filed July 26, 1960, Ser. No. 45,271
Claims priority, application Germany July 29, 1959
6 Claims. (Cl. 260—294)

The present invention relates to novel basically substituted carboxylic acid amides of the general formula

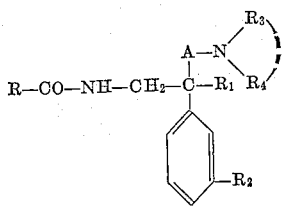

wherein R represents the radical of a straight-chain or branched α,β-unsaturated carboxylic acid with 3 to 8 carbon atoms which may contain further double linkages, or an aromatic acyl radical, a furyl or a thenyl radical or an α,β-unsaturated aralkenyl radical, $R_1$ represents an alkyl radical containing 1–4 carbon atoms, $R_2$ represents a hydroxy or an alkoxy group containing 1–4 carbon atoms, A an alkylene radical containing 2 to 4 carbon atoms, $R_3$ and $R_4$ represent alkyl radicals containing 1–4 carbon atoms or, together with the nitrogen atom, members of a 5- to 6-membered saturated ring system that may be interrupted by an oxygen atom, and to their salts.

The compounds are valuable medicaments and are distinguished by favorable therapeutic properties, while being well tolerated. They are particularly suitable as analgesics.

The present invention likewise relates to a process for preparing the new basically substituted carboxylic acid amides of the general formula

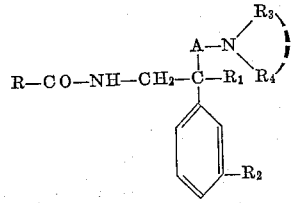

wherein R represents the radical of a straight-chain or branched α,β-unsaturated carboxylic acid with 3 to 8 carbon atoms which may contain further double linkages, or an aromatic acyl radical, a furyl radical or a thenyl radical or an α,β-unsaturated aralkenyl radical, $R_1$ is an alkyl radical containing 1–4 carbon atoms, $R_2$ represents a hydroxy group or an alkoxy group containing 1–4 carbon atoms, A represents an alkylene radical containing 2 to 4 carbon atoms, $R_3$ and $R_4$ represent alkyl radicals containing 1–4 carbon atoms or, together with the nitrogen atom, members of a saturated 5- to 6-membered ring system that may be interrupted by an oxygen atom, as well as to their salts that may be obtained according to methods which are generally used for the manufacture of those products. The compounds thus obtained may, if desired, be converted into their corresponding salts by treatment with inorganic or organic acids.

As alkyl radicals $R_1$, $R_3$ and $R_4$ according to the above identified general formula there enter into consideration, for example, methyl, ethyl, n-propyl, isopropyl, n-butyl, butyl, and sec.butyl.

As radicals $R_2$ are to be mentioned the hydroxy group as well as alkoxy radicals such as methoxy, ethoxy, propoxy, isopropoxy, n-butoxy, isobutoxy and sec.butoxy.

The substituent A may represent a straight-chain as well as a branched alkylene group containing 2–4 carbon atoms.

In addition to the meaning given above the radicals $R_3$ and $R_4$, likewise together with the nitrogen atom, may form a 5- or 6-membered ring system which may be interrupted by an oxygen atom. There may be mentioned as examples: pyrrolidine, piperidine, 2-methyl-piperidine, 4-methyl-piperidine and morpholine.

As carboxylic acids R—COOH there are appropriate compounds that contain a double linkage in α-position as well as compounds that in addition to the double linkage in α-position may still contain further double linkages in the molecule; the double linkages—according to classis conception—may likewise be present in an aromatic ring system. In detail, there may be mentioned as example:

α-Methyl-acrylic acid, dimethyl-acrylic acid, crotonic acid, α-methyl-crotonic acid, α,β-dimethyl-crotonic acid, β-chloro-isocrotonic acid, β-ethyl-crotonic acid, α-ethyl-β-methyl-crotonic acid, cis- and trans-β-neopentyl-crotonic acid, β-ethyl-α,β-pentene-acid, hexene-(2)-acid-(1), sorbic acid, 3,6-dimethyl-heptadiene-(2,4)-acid-(1), cinnamic acid and its substitution products substituted in the phenyl nucleus and/or in the side chains, benzoic acid and its substitution products such as salicylic acid, acetyl-salicylic acid, 3,4,5-trimethoxy-benzoic acid, benzoic acids substituted by halogen atoms, amino groups, alkyl groups or alkoxy groups containing 1–4 carbon atoms, naphthoic acids, diphenyl-carboxylic acids, thiophene-2-carboxylic acid and furane-2-carboxylic acid.

According to the process of the present invention it is, for instance, possible to react a basically substituted amine of the general formula

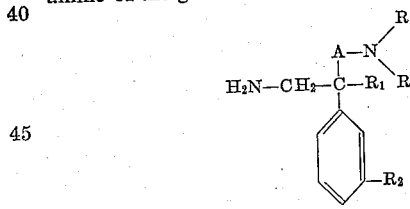

with a carboxylic acid of the formula R—COOH or with a reactive functional derivative of such a carboxylic acid. As reactive derivatives of carboxylic acids there enter into consideration, for example, the corresponding halides, anhydrides, esters or azides.

As amines for reaction with the above mentioned carboxylic acids there are suitable, for instance, the following compounds: 2-(m-methoxy-phenyl)-2-(β-piperidino-, pyrrolidino- or morpholino-ethyl)-butylamine, 2-(m-methoxy-phenyl)-2-(β-dimethylamino- or β-diethylamino-ethyl) - butylamine,   2 - (m-methoxy-phenyl)-2-[1-piperidino-propyl-(2)]-butylamine, 2-(m-butoxy-phenyl)-2-[2-dimethylamino- or morpholino-propyl-(1)]-butylamine, 2-(m-propoxy-phenyl)-2-(β - diisopropylamino - ethyl)-butylamine, 2-(m-ethoxy-phenyl)-2[β-(2-methyl - piperidino) - ethyl] - butylamine, 2-(m-methoxy-phenyl)-2-(γ-piperidino-propyl)-butylamine and the like. Instead of -butylamine there can likewise be used the corresponding propylamine, pentylamine, isoamylamine, hexylamine, isohexylamine or 3-methylpentylamine. The use of m-methoxy-phenyl-propyl-amines or the corresponding butylamines containing a basically substituted 1,2-alkylene radical, particularly the β-piperidino-ethyl radical has proved most favorable. The above-mentioned amines can be obtained according to known processes, for instance by hydrogenation of the corresponding nitriles.

An advantageous method of carrying out the process according to the invention, starting from functional derivatives of carboxylic acids, consists in using carboxylic acid halides, preferably the correspondig chlorides or bromides, as starting substances. Generally, the reaction is performed without adding external heat. It is suitable to operate at temperatures between 0 and 30° C., if necessary with external cooling. In some cases it may, however, be favorable to carry out the reaction at an elevated temperature, for instance at 60° C. The reaction can likewise be performed at the boiling temperature of the solvent used.

The reaction can be carried out in the presence or absence of solvents. As solvents there are suitable for instance: diethyl ether, diisopropyl ether, dibutyl ether, tetrahydrofurane and dioxane; furthermore liquid ketones, for instance acetone, methylethyl ketone, hydrocarbons such as petroleum ether, benzene, toluene, xylene, furthermore dimethyl-formamide, ethyl acetate or acetonitrile. The hydrogen halide set free in the reaction of the acid halides with the amines is bound in the reaction mixture by the tertiary amino group so that, when using a solvent in which the salt formed is insoluble or sparingly soluble, in many cases the crystallized hydrohalide of the corresponding basic amide is obtained as reaction product. If necessary, the product of the invention can be purified by the usual methods, for instance by recrystallization or conversion into the free base and subsequent treatment with a suitable acid. In order to bind the hydrogen halide formed during the reaction there can, however likewise be used another amine, advantageously a tertiary amine such as trimethylamine, triethylamine, dimethylaniline or pyridine, which simultaneously may be used as solvent. Furthermore, it is likewise possible to use as acceptor of the hydrogen halide an excess of the amine to be reacted or an alkali metal hydroxide, an alkaline earth metal hydroxide or an alkali metal carbonate or an alkaline earth metal carbonate. Finally, the reaction can be carried out likewise in an aqueous suspension in the presence of alkali metals or alkaline earth metals. In this case the reaction products are formed as free bases and, if desired, can be converted into the corresponding salts by treating them with physiologically suitable organic or inorganic acids.

According to the process of the invention it can likewise be started from such basic amides the carboxylic acid radical of which can be modified by producing double linkages according to the usual chemical methods. For example, basic amides containing one or several, preferably 1–2, hydroxy groups can be used as starting substances and can be converted into the desired products by splitting off water. When operating in this manner, the hydroxy groups of these starting substances can likewise be esterified with inorganic or organic acids. In this case the desired products can be produced by splitting off the corresponding inorganic or organic acids. There are particularly suitable esters derived from hydrohalic acids, preferably hydrochloric and hydrobromic acid, i.e. the amides of halogenated carboxylic acids, from which, according to usual methods, for instance by treatment with inorganic or organic bases, hydrogen halide can be eliminated while double linkages are introduced. In some cases it is possible to displace by known methods, for instance by treatment with alkaline agents, in the carboxylic acid radical of the products obtained the double linkages within the acid radical, for instance from $\beta,\gamma$-position into $\alpha,\beta$-position which has proved particularly advantageous.

The compounds obtained according to the invention are valuable medicaments and are, while being well tolerated, distinguished by favorable therapeutic properties. They are especially suitable as analgesics.

When testing the compounds as regards this analgesic activity in the mouse (modified method according to Wolff-Hardy), the $\beta$-methyl-crotonic acid-2-(m-methoxy-phenyl) - 2 - ($\beta$-piperidino-ethyl)-butylamide-hydrochloride in a dosage of 7.5 milligrams/kilogram, subcutaneously administered, for instance, completely suppresses the reaction on pain. This action nearly corresponds to that of 20 milligrams/kilogram of the known 1-methyl-4-phenyl 1-piperidino-4-carboxylic acid-ethylester-hydrochloride. Likewise on oral administration the above mentioned compound is very active and causes analgesy in the mouse with a dosage of 20 milligrams/kilogram.

In comparison with the analgesic effect the toxicity is relatively low. For instance, the LD 50 in the mouse with subcutaneous injection of a solution of 0.2% strength, amounts to 100 milligrams/kilogram and on oral application to 150 milligrams/kilogram.

The products obtained according to the invention can be used as such or in the form of their salts, if necessary in admixture with the usual pharmaceutically acceptable carriers. For the salt formation which is carried out according to usual methods, there can be used, for instance, hydrohalic acids such as hydrochloric and hydrobromic acid, sulfuric acid, phosphoric acid, amidosulfonic acid; as organic acid there may be used, for instance, formic acid, acetic acid, malonic acid, succinic acid, lactic acid, maleic acid, para-aminosalicylic acid and aceturic acid.

The new compounds can be used as medicaments, for example, in the form of pharmaceutical preparations which contain them in admixture with an adjuvant as a carrier which facilitates administration, e.g. non-toxic, therapeutically useful pharmaceutical organic or inorganic, solid or liquid carrier substances as do not react with the new compounds, for instance water, gelatine, lactose, starch, magnesium stearate, talc, vegetable oils, benzylalcohol, gums, polyalkylene glycols, cholesterol, or other known medicament carriers. They can thus be applied, for instance, with or without addition of wetting agents, emulsifiers or stabilizers, if desired, in sterile condition as solutions, tablets, dragees, capsules, drops, suppositories or suspensions.

The following examples serve to illustrate the invention but they are not intended to limit it thereto.

*Example 1*

To a solution of 11.8 grams of $\beta$-methyl-crotonic acid-chloride in 150 milliliters of ether there is added at 0° C. to +5° C. dropwise while stirring a solution of 29 grams of 2-(m-methoxy-phenyl)-2-($\beta$-piperidino-ethyl)-n-butylamine in 100 milliliters of ether. The mixture is stirred for some time at room temperature, the salt that has formed (40.5 grams is filtered off with suction and recrystallized from alcohol/ether. The thus obtained $\beta$-methyl - crotonic acid-2-(m-methoxy-phenyl)-2-($\beta$-piperidino-ethyl)-butylamide-hydrochloride melts at 191–193° C. The same compound is obtained when benzene is used as solvent and the reaction is carried out at a temperature of 20–30° C.

According to the instructions given in Example 1 there were further prepared:

(a) From hexene-(2)-acid-(1)-chloride the hexene-(2) - acid - (1) - 2-(m-methoxy-phenyl)-2-($\beta$-piperidino-ethyl)-butylamide-hydrochloride melting at 159–160° C.

(b) From 2-methyl-crotonic acid-chloride the 2-methyl-crotonic acid-2-(m-methoxy-phenyl)-2-($\beta$-piperidino-ethyl)-butylamide-hydrochloride melting at 167–168° C.

*Example 2*

A mixture of 29 grams of 2-(m-methoxy-phenyl)-2-($\beta$-piperidino-ethyl)-butylamine and 100 milliliters of benzene is gradually added while mechanically stirring, to 10.5 grams of crotonic acid chloride in 200 milliliters of benzene, while the temperature is allowed to attain 40° C. After diminishing of the reaction heat ether is added to the reaction mixture and the latter is stirred until the salt that has formed is present in good crystalline form. There are obtained 37 grams of crotonic acid - 2 - (m - methoxy-phenyl)-2-(β-piperidino-ethyl)-butylamide-hydrochloride melting after recrystallization from methanol/ether at 110–115° C. (The melting point depends on the heating velocity.)

*Example 3*

By an operating method analogous to that described in Example 1 there is obtained from cinnamic acid chloride and 2 - (m-methoxy-phenyl-2-(β-piperidino-ethyl)-butylamine the cinnamic acid-2-(m-methoxy-phenyl)-2-(β - piperidino-ethyl) - butylamide-hydrochloride which after recrystallization from methanol/ether melts at 192–195° C.

*Example 4*

By an operating method analogous to that described in Example 1 there is obtained by reaction of sorbic acid chloride with 2 - (m - methoxy-phenyl)-2-(β-piperidino-ethyl)-butylamine the sorbic acid-2-(m-methoxy-phenyl)-2 - (β-piperidino-ethyl)-butylamide-hydrochloride. After recrystallization from methanol/ether the substance melts at 181–186° C.

*Example 5*

While mechanically stirring, a solution of 14.5 grams of 2 - (m-methoxy-phenyl)-2-(β-piperidino-ethyl)-butylamine in 50 milliliters of benzene is dropwise added at 20–25° C. to 7 grams of benzoyl-chloride in 100 milliliters of benzene. The benzoic acid-2-(m-methoxyphenyl) - 2 - (β-piperidino-ethyl)-butylamide-hydrochloride is obtained melting at 195–196° C. upon recrystallization from methanol/ether.

According to the instructions of operation given in Example 5 there were likewise prepared:

(a) By starting from 2-(m-hydroxy-phenyl)-2-(β-piperidino-ethyl)-butylamine and β-methyl-crotonic acid-chloride the β-methyl-crotonic acid-2-(m-hydroxy-phenyl) - 2 - (β - piperidino-ethyl)-butylamide-hydrochloride which melts at 228–230° C.

(b) By starting from furane-(2)-carboxylic acid-chloride and 2-(m-methoxy-phenyl-2-(β-piperidino-ethyl)-butylamine the furane-(2)-carboxylic acid-2-(m-methoxy-phenyl) - 2 - (β - piperidino - ethyl) - butylamide - hydrochloride which melts at 170–172° C.

(c) By starting from benzoyl chloride and 2-(m-methoxy - phenyl - 2 - (β - morpholino - ethyl) - butylamine the benzoic acid-2-(m-methoxy-phenyl)-2-(β-morpholino-ethyl)-butylamide, melting at 174–176° C.

(d) The benzoic acid-2-(m-methoxy-phenyl) - 2-(β-piperidino-ethyl)-propylamide-hydrochloride which melts at 160–161° C.

(e) The thiophene-(2)-carboxylic acid-2-(m-methoxy-phenyl - 2 - (β - piperidino - ethyl) - butylamide - hydrochloride which melts at 183–184° C.

(f) The 3,6-dimethyl-heptadiene-(2,4)-acid-(1)-2-(m-methoxy - phenyl) - 2 - (β - piperidino - ethyl) - butylamide-hydrochloride, which after recrystallization from ethyl-acetate melts at 112–114° C.

*Example 6*

1.5 grams of 2-(m-methoxy-phenyl-2-(β-piperidino-ethyl)-butylamine mixed with 75 milliliters of benzene are dropwise added, while stirring, at 20° C., to 9.9 grams of acetyl-salicyclic acid-chloride in 100 milliliters of benzene. At first, a clear solution is obtained from which, after inoculation, 20 grams of O-acetyl-salicyclic acid-2 - (m - methoxy - phenyl) - 2 - (β - piperidino - ethyl)-butylamide-hydrochloride crystallize out. The compound melts at 158–160° C. after recrystallization from methanol/ether.

*Example 7*

11.5 grams of 3,4,5-trimethoxy-benzoylchloride are dissolved in 200 milliliters of benzene and 14.5 grams of 2 - (m - methoxy - phenyl) - 2 - (β - piperidino - ethyl)-butylamine are dropwise added while stirring at 20–30° C. A crystalline magma is obtained which after filtering with suction is washed with benzene and ether, dried and recrystallized from ethanol of 94% strength. The 3,4,5 - tri - methoxy - benzoic acid - 2 - (m - methoxyphenyl)-2-(β - piperidino - ethyl) - butylamide - hydrochloride obtained in good yield melts at 214–216° C.

*Example 8*

When operating according to Example 5 there is obtained from β-methyl-a crotonic acid-chloride and 2-(m-methoxy - phenyl) - 2 (β - morpholino - ethyl) - butylamine the β-methyl-crotonic acid-2-(m-methoxy-phenyl)-2 - (β - morpholino - ethyl) - butylamide - hydrochloride which, after recrystallization from ethanol/ether melts at 171–173° C.

*Example 9*

A solution of 30.6 grams of 2-(m-methoxy-phenyl)-2-(β-diethylamino-ethyl)-hexylamine in 100 milliliters of benzene is dropwise added at 20–30° C. to a solution of 12-grams of β-methyl-crotonic-acid-chloride in 100 milliliters of benzene and the reaction mixture is then heated for 30 minutes under reflux. On cooling, the desired β - methyl - crotonic acid-2-(m-methoxy-phenyl)-2 - (β - diethylamino - ethyl) - hexylamine - hydrochloride crystallizes out which, after recrystallization from isopropanol melts at 184–185° C.

According to the instructions of operation given in Example 9 there were furthermore obtained:

(a) By starting from benzoyl-chloride and 2-(m-methoxy - phenyl) - 2 - (β - dimethylamino - ethyl) - 3-methyl-butylamine the benzoic acid-2 - (m - methoxy-methyl-butylamine - 2 - (β - dimethylamino - ethyl) - 3 - methylphenyl) - 2 - (β - dimethylamino - ethyl) - 3 - methylbutylamide-hydrochloride melting at 164–165° C.

(b) By starting from benzoyl-chloride and 2-(m-butoxy-phenyl)-2-(β-piperidino-ethyl)-butylamine the benzoic acid - 2 - (m - butoxy - phenyl) - 2 - (β - piperidinoethyl)-butylamide-hydrochloride melting at 162–164° C.

*Example 10*

According to the method described in Example 9, 12 grams of β-methyl-crotonic acid-chloride are reacted with 25.1 grams of 2-(m-methoxy-phenyl)-2-(β-dimethyl-amino-ethyl)-butylamine. When the reaction is terminated the benzene used as solvent is distilled off in the water jet vacuum and the residue is recrystallized from isopropanol. The β - methyl - crotonic acid - 2 - (m-methoxy - phenyl) - 2 - (β - dimethylamino - ethyl)-butylamide-hydrochloride is obtained which melts at 170–171° C.

*Example 11*

26.4 grams of 2-(m-methoxy-phenyl)-2-(dimethyl-aminopropyl)-butylamine are reacted according to the method described in Example 9 with 12 grams of β-methyl-crotonic acid chloride, the benzene is then distilled off in the water jet vacuum and the residue is dissolved in water. After filtration of the aqueous solution by means of charcoal the filtrate is rendered alkaline by means of potassium carbonate. The separated free base is taken up in ether and after drying by means of sodium sulfate the ether is distilled off. The β-methylcrotonic acid - 2 - (m - methoxy - phenyl) - 2 - (dimethylamino-propyl)-butylamide is obtained in the form of a viscous oil.

Calculated: C, 72.7; H, 9.8; N, 8.1. Found: C, 72.4; H, 9.8; N, 8.2.

The 2 - (m - methoxy - phenyl) - 2 - (dimethylamino-propyl)-butylamine serving as starting material is suitably prepared by condensing 2-(m-methoxy-phenyl)-butyronitrile with 2-chloro-1-dimethylaminopropane and sodium amide to the corresponding basically substituted nitrile, and the nitrile group is reduced to the aminomethyl-group by means of Raney nickel in methanol.

Since in the analogous reaction of diphenylacetonitrile with 2-chloro-1-dimethylamino-propane a mixture of two isomeric basic nitriles is obtained [cf. Liebigs Annalen der Chemie 561 (1948), 54], it can be supposed that likewise in the present case two isomeric nitriles and consequently two isomeric butylamines will be obtained. For this reason the reaction product may be considered as a mixture of β-methyl-crotonic acid-2-(m-methoxy-phenyl) - 2 - [1 - dimethylamino - propyl - (2)] - and-[-2-dimethylamino-propyl(1)]-butylamide.

According to the instructions of operation given in Example 11 there was prepared from hexene-(2)-acid-(1)-chloride with 2-(m-methoxy-phenyl)-2-(β-piperidino-ethyl)-propylamine the hexene-(2)-acid-(1)-2-(m-methoxy-phenyl)-2-(β-piperidino-ethyl)-propylamide whose neutral naphthalene-1,5-disulfonate, after recrystallization from methanol-acetone melts at 166–168° C.

*Example 12*

According to the method described in Example 9 there is obtained from 12 grams of β-methyl-crotonic acid-chloride and 27.8 grams of 2-(m-methoxy-phenyl)-2-(β-diethylamino-ethyl)-butylamine the β-methyl-crotonic acid-2 - (m - methoxy - phenyl) - 2 - (β - diethylamino - ethyl)-butyl-amide-hydrochloride. The product melts at 174° C. after recrystallization from isopropanol.

We claim:

1. A member selected from the group consisting of carboxylic acid amides of the formula

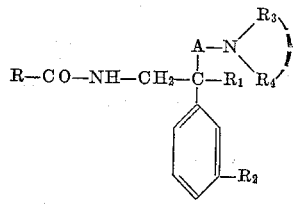

wherein R is a member of the group consisting of (I) straight-chain and branched α,β-unsaturated alkenes of from 3 to 8 carbon atoms and with 1 to 2 double bonds, (II) phenyl, hydroxyphenyl, acetoxyphenyl, halophenyl, aminophenyl, $C_1$ to $C_4$ alkylphenyl and $C_1$ to $C_4$ alkoxyphenyl groups, naphthyl and diphenyl, (III) cinnamyl, (IV) furyl-2, and (V) thenyl-2, $R_1$ is alkyl of from 1 to 4 carbon atoms, $R_2$ is a member selected from the group consisting of hydroxy and alkoxy of from 1 to 4 carbon atoms, A is alkylene of from 2 to 4 carbon atoms, $R_3$ and $R_4$ are members of the group consisting of alkyl of from 1 to 4 carbon atoms and, together with the nitrogen atom, form heterocyclic rings selected from the group consisting of pyrrolidino, piperidino, 2-methyl-piperidino, 4-methyl-piperidino and morpholino, and physiologically compatible acid addition salts thereof.

2. The β-methyl-crotonic acid-2-(m-methoxy-phenyl)-2-(β-piperidino-ethyl)-butylamide.

3. The benzoic acid-2-(m-methoxy-phenyl)-2-(β-piperidino-ethyl)-butylamide.

4. The hexene-(2)-acid-(1)-2-(m-methoxy-phenyl)-2-(β-piperidino-ethyl)-butylamide.

5. The cinnamic acid-2-(m-methoxy-phenyl)-2-(β-piperidino-ethyl)-butylamide.

6. The sorbic acid-2-(m-methoxy-phenyl)-2-(β-piperidino-ethyl)-butylamide.

References Cited in the file of this patent

UNITED STATES PATENTS

| | | |
|---|---|---|
| 2,798,072 | Pohland | July 2, 1957 |
| 2,874,182 | Surrey | Feb. 17, 1959 |

OTHER REFERENCES

Rose et al.: "J. Lab. Clin. Med.," volume 44, pages 571–81 (1954).